United States Patent [19]

Burt

[11] 4,175,437
[45] Nov. 27, 1979

[54] FIRE, TEMPERATURE OR HEAT DETECTOR

[76] Inventor: Dennis W. Burt, The Bungalow, Woodhouse La., Moulton Loosegate, Spalding, Lincolnshire, England

[21] Appl. No.: 916,533

[22] Filed: Jun. 19, 1978

[51] Int. Cl.² ............................................. G01K 7/24
[52] U.S. Cl. ................................ 73/362 AR; 338/26; 340/596
[58] Field of Search .................... 73/362 AR; 338/26; 340/596

[56] References Cited

U.S. PATENT DOCUMENTS

| 2,750,482 | 6/1956 | Peterson | 338/26 |
| 3,396,357 | 8/1968 | Borg | 338/26 |
| 3,429,183 | 2/1969 | Lindberg | 73/362 AR |

Primary Examiner—S. Clement Swisher
Attorney, Agent, or Firm—Browdy and Neimark

[57] ABSTRACT

A fire, temperature or heat detection system is disclosed which comprises a cable having at least two conductors separated by insulation whose electrical characteristics vary with temperature, and means connected to the conductors of the cable for detecting variations in the electrical characteristics of the insulation.

7 Claims, 2 Drawing Figures

OPTIMUM CABLE LENGTHS TEMPERATURE VS CIRCUIT VOLTAGE
AVERAGE AMBIENT 92°F

FIRE, TEMPERATURE OR HEAT DETECTOR

This invention relates to a fire, heat or temperature detector, using a Polyvinyl Chloride (pvc), Silicon or Rubber insulated cable as the detecting element. Changes in the electrical characteristics of the cable insulation due to charges in its surrounding temperature, are sensed by a potentiometric type circuit. The output of the bridge provides an analogue signal proportional to the cable temperature and actuates warning and/or protective devices at preset levels.

An undesirable feature, if cable insulation is used as a fire detecting element, is that the insulation temperature vs. impedance vs. length coefficient tends to be linear, i.e. typically the resultant impedance or d.c. resistance of 1 meter at 195° F. is the same as 100 meters at 85° F. This feature, unless rectified, precludes the use of cable insulation as fire detecting elements except in very short lengths. Such a method of fire detection would offer limited advantages over single point/position heat detectors already commercially available.

A second undesirable property of cable insulation, if used as a fire detecting element, is that the insulation resistance between conductors is extremely high, typically 22,000 Hegohms for 1,000 meters of 3 mm pvc cable at 68° F., and its absolute value difficult to guarantee, within acceptable limits for instrumentation, during manufacture. Therefore any system or circuitry based upon variations in cable insulation absolute value of resistance would require the design of switches, terminals, electronics, and similar equipment, to much higher insulation values than are commercially available hitherto to avoid errors in the measured signal, and would further require individual input circuitry per cable.

The circuitry of this invention now to be described has been developed to overcome the disadvantages mentioned in the preceeding paragraph, and to exploit the technical attraction of using cable insulation as a fire detecting element. This attraction is that the temperature vs. impedance or d.c. resistance curve of cable insulation has a very steep angle, and although there are variations in absolute values, the angle of the curve is consistent for all standard cable insulations.

Figure 1:
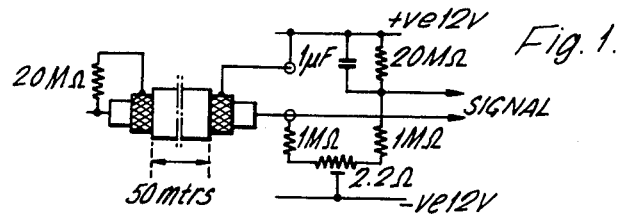
FIG. 1 is a schematic view of the detector and measuring circuit.

In the invention now to be described one end of a cable having two conductors separated by pvc, silicon or rubber insulation to be used as a fire detector is connected to potentiometric type circuit (see FIG. 1). At the other end of the cable, the conductors are connected to a fixed resistor designated the 'padder'. The connection of the padder to the same conductors effectively makes a parallel circuit with the insulation to form the first arm of the bridge.

The resistance value of the padder is chosen to be slightly higher than the equivalent d.c. resistance of the insulation of an optimum length of the cable, at the chosen fire alarm temperature of the proposed fire alarm installation. Typically though not necessarily the padder values will vary between 20 Megohms to 22 Megohms for a 3 mm pvc coaxial cable to have an alarm setting between 160° F. to 200° F. The effect of the padder resistance in parallel with the cable insulation is to —

(a) Reduce the resistance variations at the bridge to economically measurable values, since the resultant of the two resistances in parallel will always be lower than the padder value on its own.

(b) 'Swamp' variations in the electrical characteristic absolute values of the cable insulation caused by manufacturing intolerances. The resistance values of the insulation at the alarm level, is sufficiently consistent between cables of similar construction, to enable the exact alarm point per cable to be set by a potentiometer in a universal design of bridge.

(c) Introduce desirable non-linearity into the temperature vs. electrical resistance vs. length coefficient of the resultant effective d.c. resistance at the bridge.

Figure 2:
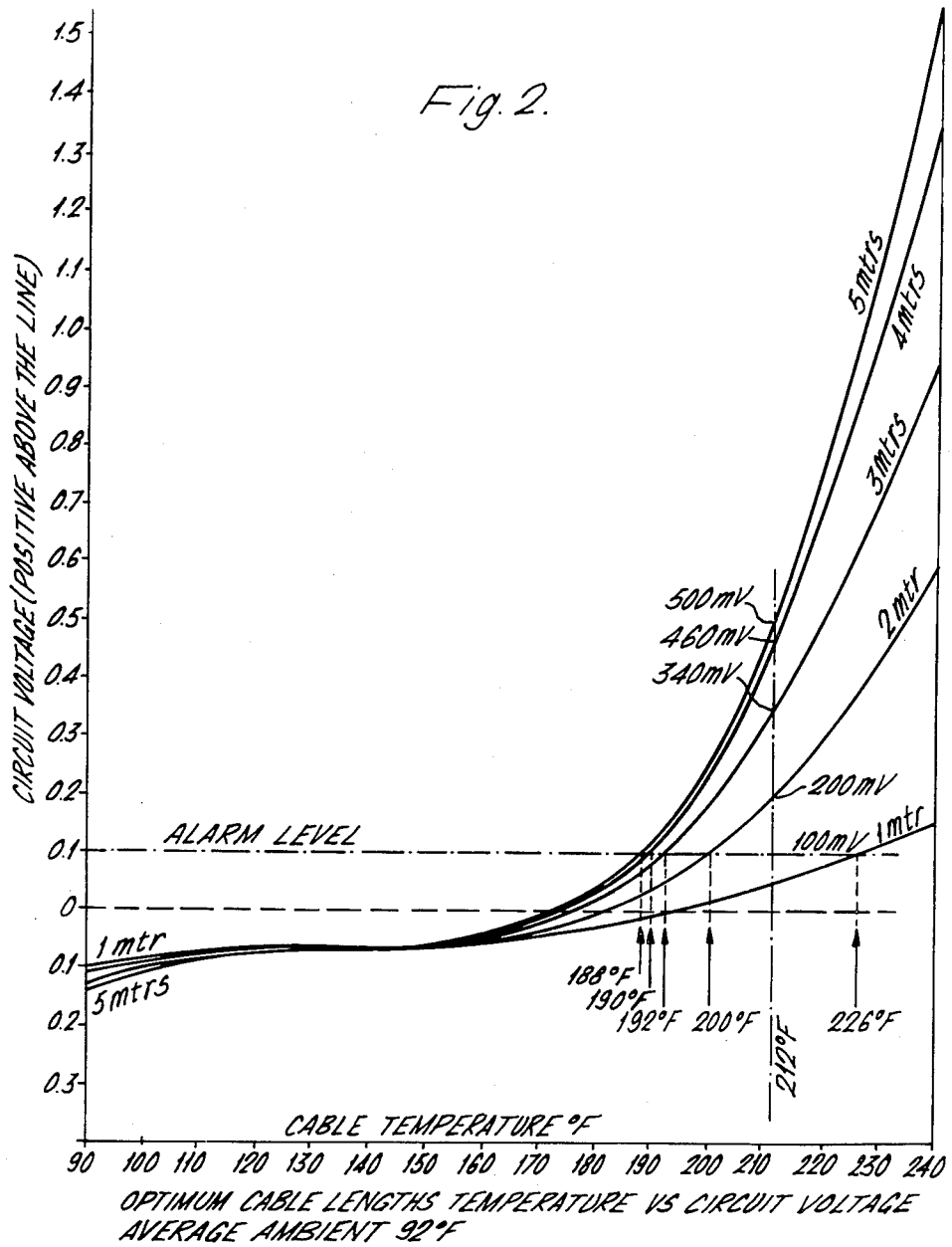
FIG. 2 is a graph showing the relationship of detector temperature to circuit voltage.

The non-linearity introduced by the padder is enhanced by careful selection of the resistance values forming the other three arms of the bridge circuit. A typical set of values developed to give the required knee or 'kink' in the characteristic, is shown in FIG. 1, the result of these values with the pvc insulated cable and padder value as also indicated will result in the curve shown in FIG. 2, other shapes with other values are possible.

The capacitance in parallel with the resistance in the second arm of the bridge, is necessary to balance to the cable insulation impedance. The capacitor is not critical in value but is critical in type, polyester the most acceptable. The value of the resistance in the bridge second arm is varied as a coarse bias for the alarm setting potentiometer. The resistance is normally 20 Megohms for an alarm setting range between 140° F. to 200° F., increasing the resistance value reduces the range to lower temperature levels. The capacitance in parallel with the resistance does not have to change its value, for changes in the resistance value.

The invention circuitry enables any pvc, silicon or rubber insulated cable to be used as a fire detector but there are other factors which encourage the use of a preferred configuration. Repeatability and accuracy of the system is a function of the contact pressure and surface area between the conductors and the insulation. Theoretically and empirically it has been demonstrated that a coaxial type of construction is the most efficient and stable.

The electrical analogue signal generated by the unbalance of the bridge is fed as the input to a differential amplifier. This amplifier must be individually capable of, or in conjunction with other amplifiers capable of, providing signals suitable to drive standard commercially available equipment, for firm alarm, temperature indication or heat control.

The invention cables can be used on their own for automatic fire detection/prevention, environmental temperature indication/control, and excessive heat alarm or combined with other cables. To be now described and included within this patent is a specific type of combined dual function cable whereby the same cable provides electrical power for alarm/control purposes and automatic detection.

In this dual cable two or more separate cables are combined within a common sheath. One or more cables form the inner of the dual cable and provides electrical power to warning devices or control systems in the monitored area. These will have fire/heat retardant properties and comply with Fire Regulations or any other National Legislation for the maintenance of electrical power under adverse conditions. The other cable or cables comprises a fire, temperature or heat detection cable as previously described using pvc, silicon or rubber insulation, either as a coaxial around the first cable, or as a separate cable within a common sheath. This dual cable is a sufficiently composite whole as to only require a single cable installation and fixings.

I claim:

1. A fire, temperature or heat detection system, comprising a cable having at least two conductors separated by an electrically insulating material whose electrical resistance varies as a continuous function of temperature, and signal deriving means connected to the conductors of the cable for deriving an analog signal proportional to the electrical resistance of the insulating material and thus proportional to the cable temperature.

2. A detection system as claimed in claim 1, wherein said insulating material is polyvinyl chloride.

3. A detection system as claimed in claim 1, wherein said insulating material is silicone rubber or ethylene/propylene rubber.

4. A detection system as claimed in claim 1, wherein said signal deriving means comprises a bridge circuit.

5. A detection system as claimed in claim 4, wherein said bridge circuit is a Wheatstone bridge circuit.

6. A detection system as claimed in claim 1, wherein by use of a cable parallel padder resist. and by use of a Wheatstone bridge type circuit with suitable values, the electrical characteristics of the system are modified from a natural linear function to a more desirable sharp curve.

7. A detection system as claimed in claim 4, wherein the circuit includes means for producing an indication or alarm when the electrical resistance of the insulating material reaches a predetermined value.

* * * * *